(12) United States Patent
Philips et al.

(10) Patent No.: US 9,173,180 B2
(45) Date of Patent: Oct. 27, 2015

(54) SYNCRONIZING WIRELESS DEVICES

(75) Inventors: Norbert Philips, Bertem (BE); Valentin Claessens, Sint-Truiden (BE); Steven Mark Thoen, Leuven (BE); Thierry G C Walrant, Bouge (BE)

(73) Assignee: NXP, B.V., Eindhoven (NL)

( * ) Notice: Subject to any disclaimer, the term of this patent is extended or adjusted under 35 U.S.C. 154(b) by 407 days.

(21) Appl. No.: 13/353,839

(22) Filed: Jan. 19, 2012

(65) Prior Publication Data

US 2012/0188998 A1 Jul. 26, 2012

(30) Foreign Application Priority Data

Jan. 26, 2011 (EP) .................................... 11152178

(51) Int. Cl.
*H04J 3/06* (2006.01)
*H04W 56/00* (2009.01)
*H04W 28/06* (2009.01)
*H04W 92/18* (2009.01)

(52) U.S. Cl.
CPC ......... *H04W 56/001* (2013.01); *H04R 2420/07* (2013.01); *H04W 28/06* (2013.01); *H04W 56/0035* (2013.01); *H04W 92/18* (2013.01)

(58) Field of Classification Search
CPC ... H04W 56/00; H04W 56/001; H04W 92/18; H04W 56/002; H04L 1/1829; H04J 11/0076; H04J 13/00; H04J 3/0602
See application file for complete search history.

(56) References Cited

U.S. PATENT DOCUMENTS

| | | | |
|---|---|---|---|
| 2006/0030343 A1* | 2/2006 | Ebner et al. | 455/502 |
| 2008/0159252 A1* | 7/2008 | Bi et al. | 370/345 |
| 2008/0247339 A1 | 10/2008 | Choi et al. | |
| 2008/0304469 A1* | 12/2008 | Dorion | 370/347 |
| 2009/0080334 A1* | 3/2009 | DeCusatis et al. | 370/237 |
| 2009/0129272 A1* | 5/2009 | Padfield et al. | 370/235 |
| 2009/0279529 A1* | 11/2009 | Hamalainen et al. | 370/350 |
| 2009/0323586 A1* | 12/2009 | Hohl et al. | 370/328 |
| 2010/0046494 A1 | 2/2010 | Palanki et al. | |
| 2011/0158264 A1 | 6/2011 | Philips et al. | |
| 2012/0134455 A1* | 5/2012 | Wang et al. | 375/354 |

FOREIGN PATENT DOCUMENTS

| | | |
|---|---|---|
| EP | 1 416 648 A1 | 5/2004 |
| EP | 2424304 A1 | 2/2012 |
| FR | 2 882 486 A1 | 8/2006 |
| GB | 2 421 153 A | 6/2006 |
| WO | 01/08344 A2 | 2/2001 |
| WO | 02/37714 A1 | 5/2002 |

OTHER PUBLICATIONS

Extended European Search Report for EP Patent Appln. No. 11152178.7 (Jul. 6, 2011).

* cited by examiner

*Primary Examiner* — Chi H Pham
*Assistant Examiner* — Raul Rivas

(57) ABSTRACT

A method of synchronising the reference clock of a first wireless device with a master reference clock of a second wireless device via a wireless network. The method involves transmitting, from the second wireless device to the first wireless device, a dedicated synchronisation frame via a dedicated synchronisation channel; receiving the dedicated synchronisation frame at the first wireless device; and synchronising the reference clock of the first wireless device with the master reference clock of the second wireless device based on the received dedicated synchronisation frame.

19 Claims, 7 Drawing Sheets

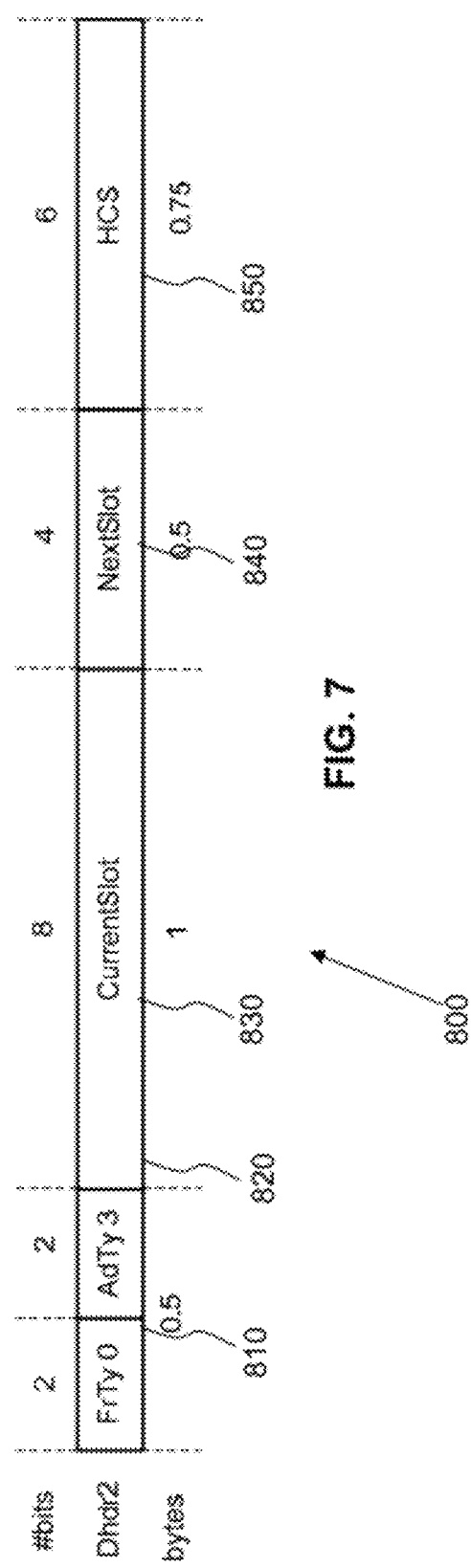

SYNCRONIZING WIRELESS DEVICES

This application claims the priority under 35 U.S.C. §119 of European patent application no. 11152178.7, filed on Jan. 26, 2011, the contents of which are incorporated by reference herein.

FIELD OF THE INVENTION

This invention relates to synchronizing wireless devices, and more particularly to synchronizing wireless devices in a wireless network.

BACKGROUND OF THE INVENTION

Wireless network devices typically need to be synchronized with each other in order to avoid a large timing offset which can impact the correct reception of wireless data. Accordingly, it is known to derive the timing for the network communication protocol from a local master clock.

In a wireless network device, e.g. magnetic induction (MI)-based, the local master clock can be the RC oscillator of the (MI) physical layer, the master clock of an audio interface or an external crystal oscillator. An on-chip local oscillator of the device's protocol processor is then locked to this master clock, and used to determine the timing network communication. Typically, the RC oscillator of the MI physical layer is used as the device local master clock in order to limit power consumption and to spare the required physical space (in other words, no external crystal oscillator is required).

The RC oscillator of an MI physical layer (used as device local master clock) can deviate up to 1% from its nominal value due to factors such as power supply voltage variations and local on-chip temperature changes. Hence, the oscillator frequency of the different network devices typically needs to be synchronized in order to avoid large timing offset which impact the correct reception of wireless frames.

Wireless frames are typically divided into specific and standardized sections. By way of example, a wireless frame typically has a MAC header, payload and Frame Check Sequence (FCS). Wireless frames may be organized in a larger structure, which can be identified as a superframe. A superframe may be divided in a number of timeslots and a wireless frame may occupy one or more timeslots in such a superframe. A superframe may also contain a beacon frame to indicate the start of the superframe.

The conventional method used to keep network devices in sync is to frequently send beacon frames. However, frequent beacon frame transmission consumes bandwidth which reduces the protocol streaming efficiency. Furthermore, if only the beacon frame is used for time synchronization, a frequency deviation of e.g. 0.5% will cause a full timeslot miss-alignment at the end of a typical superframe having 256 timeslots.

SUMMARY OF THE INVENTION

According to an aspect of the invention there is provided a method of synchronising the reference clock of a first wireless device with a master reference clock of a second wireless device via a wireless network, the method comprising: transmitting, from the second wireless device to the first wireless device, a dedicated synchronisation frame via a dedicated synchronisation channel; receiving the dedicated synchronisation frame at the first wireless device; and synchronising the reference clock of the first wireless device with the master reference clock of the second wireless device based on the received dedicated synchronisation frame.

The proposed method may comprise the conditional installation of a synchronisation channel and the conditional transmission of a dedicated synchronisation frame, from the second wireless device to the first wireless device, via the dedicated synchronisation channel. The synchronisation channel may only be employed to transmit dedicated synchronisation frames when the density of other frames, such as data and beacon frames, transmitted within the network for synchronisation purposes is below a predetermined threshold value (i.e. too low for adequate synchronisation accuracy).

Proposed is the implementation of a synchronization channel for a wireless network which complements other wireless frames (e.g. beacon frames, data frames) that can be used for synchronisation purposes. The synchronization channel may enable the transmission of dedicated synchronisation (sync) frames whenever required. The synchronisation channel may only be employed when the density of the other wireless frames is too low for keeping the network devices synchronised. Such transmission of sync frames may ensure sufficient frame density to enable receiving devices to get and stay synchronized.

The proposed approach may exclude the use of more frequent (permanent) beacons which reduce the network communication protocol efficiency in terms of available bandwidth. It may also exclude the use of synchronisation frames when the density of other wireless frames that can be used for synchronisation is sufficiently high.

The proposed use of a sync channel may complement regular frames only whenever required. That is, the sync channel may be adapted to avoid consuming bandwidth when the frame density is sufficiently high.

Embodiments may also allow the use of a RC oscillator which reduces the power consumption and helps the miniaturization.

According to another aspect of the invention there is provided a wireless device having a reference clock for synchronising with a master reference clock via a wireless network, the wireless device comprising: a receiving unit adapted to receive a dedicated synchronisation frame via a dedicated synchronisation channel; and a processor adapted to synchronise the reference clock of the first wireless device with the master reference clock of the second wireless device based on the received dedicated synchronisation frame.

The wireless network may be a magnetic induction, MI, based wireless network, and the first and second wireless devices may thus be MI-based wireless network devices (such as wireless hearing aid devices, for example).

In other embodiments, the wireless network may be a Radio-Frequency (RF)-based network.

BRIEF DESCRIPTION OF THE DRAWINGS

Examples of the invention will now be described in detail with reference to the accompanying drawings, in which:

FIG. 7 illustrates a sync frame according to an embodiment of the invention.

DETAILED DESCRIPTION OF EMBODIMENTS

Figure 1:
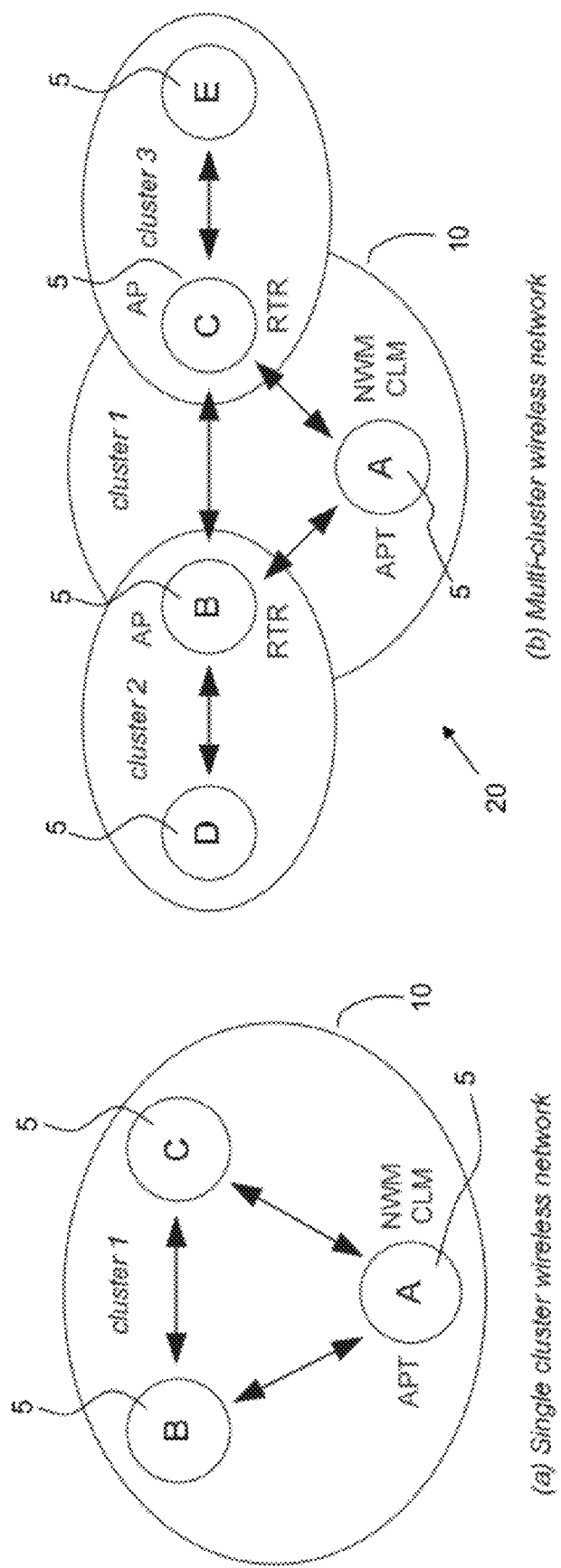
FIG. 1a illustrates an example of a single cluster wireless network according to an embodiment of the invention.
FIG. 1b illustrates an example of a multi-cluster wireless network according to an embodiment of the invention.

The same reference numbers have been used in different figures to denote the same components and layers, and the description is not repeated.

Embodiments of the invention will be described in the context of a proposed network protocol intended for use with a family of wireless hearing aid devices. Compared to a conventional network protocol for wireless hearing aid devices, the proposed embodiments may provide improved flexibility for setting up connections. Embodiments may also operate with different types of physical layer and in multi-cluster wireless networks.

A network based on the proposed network protocol is organized as a mesh network with distributed intelligence and distributed responsibilities. Mesh networking is a method to route data between nodes. It allows creating connections between devices that are not within each others range by "hopping" from node to node until the destination is reached. It also allows reconfiguring connections around broken or blocked paths by modifying the hopping sequence. Mesh networks are self-healing: when a node breaks down or a connection goes bad, an alternative path to the destination (when available) will be used. As a result such a network is very reliable.

Devices first have to join a network before they can communicate with other devices within that network. Access to the network may be granted by a network access point (AP). Typically, a join request will be transmitted in a so-called random access communication (RAC) timeslot of a superframe. Before a device can send a join request to the network access point, it has to find a beacon frame that indicates the start of a superframe, and it has to synchronize its local clock with the master clock used by the network AP, so that it can properly estimate the length of the superframe and determine the location of the RAC timeslot. To enable fast and accurate clock and superframe synchronisation, the network AP should preferably provide a sufficiently high density of wireless frames, suitable for obtaining such a synchronisation. According to an aspect of the invention, additional sync frames can be provided, when needed, by installing a dedicated synchronisation channel which allows the transmission of additional synchronisation frames. The installation of such a dedicated channel may not be needed when the network AP already transmits other wireless frames that can be used for synchronisation (e.g. beacon frames, data frames) with a sufficiently high density.

According to an exemplary embodiment, communication between the devices in a network is organized in a superframe structure, which is scheduled by a central device, called the Network Manager (NWM). This device creates a network, grants the join requests and determines which timeslots of the superframe are allocated to the requested communication channels. The communication between devices may be peer-to-peer, i.e. directly from device to device (eventually via one or more hops), but not necessarily via the network manager.

Further details about the exemplary network protocol will be provided in following sections.

Network Creation Viewpoint

From network creation point of view, the following device classes are used in this description:

Slave Device—A slave device is a device that can join an existing wireless network, but it can not create a network itself. If no network is found it can switch to standby for a given period, and then search again for an active network in its neighbourhood. A slave device is typically (but not always) a device that will receive more data than it has to transmit. It is typically also a device with limited power capabilities.

Hybrid Device—A hybrid device is a device that can create a new network in case no existing wireless network is found within its range. A hybrid device is typically (but not always) a device that will transmit more data than it has to receive. When it detects an existing network in its neighbourhood, it will first try to join this network in a similar way as a slave device.

Network Protocol Viewpoint

From a network protocol point of view, a device can be identified as follows:

A Network Manager—A NWM is a device that is responsible—within a given wireless network—for the processing of a join request, the allocation of a network-specific device address to a new device that wants to join the network, and the allocation of superframe timeslots to connections that are requested. A device that creates a new wireless network becomes by default the network manager. When more devices have joined the network, the NWM function can optionally be handed over to another device. Only a hybrid device can become a network manager.

A Clock Master (CLM)—A CLM is a device that provides a reference clock for the wireless communication between the devices. The clock reference will be derived from the frames transmitted by this device. All other devices of the wireless network synchronize their local reference oscillator with this clock master. A device that creates a new wireless network becomes by default the clock master. When more devices have joined the network, the CLM function can be handed over to another device. A CLM is typically a source device that is located centrally within the network cluster. Only a hybrid device can become a clock master. The clock master is typically also the network manager, although this is not mandatory.

An Access Point (AP)—An AP is a device that enables new devices to synchronize with the clock master of a wireless network. It will also handle join requests of these devices. Only hybrid devices can become an access point. A device that creates a new wireless network becomes by default the access point for that network. Other hybrid devices that join the network can also support the access point function.

A Router—A router is a device that supports the routing of messages and data streams between devices that can not talk directly to each other because they are out of each other's range. This function is needed in multi-cluster networks (as explained below in the section entitled "Network Topologies). Only hybrid devices can act as a router.

Neighbours—Two devices are called neighbours when they are within each other's transmitting range and receiving range. This means that they can communicate bi-directionally with each other, without the need for a router. Otherwise, they are hidden for each other.

Network Topologies

A wireless network is created with the aim to enable bi-directional communication between the different devices that have joined the network.

When all devices 5 within a wireless network can communicate directly with each other, we call it a single cluster wireless network 10. An example of such a network 10 is shown in FIG. 1*a*. The devices 5 that have joined the network 10 are identified by the letters A, B and C. The bi-directional arrows indicate possible communication flows. For this example, it is assumed that device A has created the wireless network. Therefore it has become the network manager (NWM), the clock master (CLM) and the access point (AP) of the network.

A cluster is defined as a collection of devices that can talk directly to each other in both directions. This property is dependent on the characteristics of the physical layer, the distance between the devices, and possible obstacles in the wireless channel. The cluster concept can be used in a graphical representation as shown in FIG. 1*a* to indicate which devices are in range of each other and which devices are out of range.

Devices B and C may become additional access points for network cluster 1. When this function is activated, devices that are out of range for device A can still join the network via devices B or C. An example of such a network configuration is shown in FIG. 1*b*. In this case, device D can join the network 10 via access point B and device E can join the network via access point C. When their join request is granted we get a multi-cluster wireless network 20, consisting of 3 network clusters. Cluster 1 contains devices A, B and C, cluster 2 contains devices B and D and cluster 3 contains devices C and E. In this case, device B may be a router for messages between devices A and D and device C may be a router for messages between devices A and E.

When device D wants to send a message to device E, two routers are needed: device B and device C.

Devices B and C will synchronize their local reference oscillator and time base with the master clock of the clock manager (device A). Devices D and E will synchronize their local reference oscillator and time base with the frames transmitted respectively by devices B and C. As a result they will be synchronized also (indirectly) with the master clock of the network clock manager (CLM).

A multi-cluster network as shown in FIG. 1*b* can also be a heterogeneous wireless network. This is for example the case when cluster 1 uses a physical layer with an RF radio and clusters 2 and 3 use a physical layer with an MI radio. When devices B and C have both physical layers they may act as a bridge so that one overall network of interconnected devices can be obtained in a similar way as for multi-cluster networks.

Figure 2:
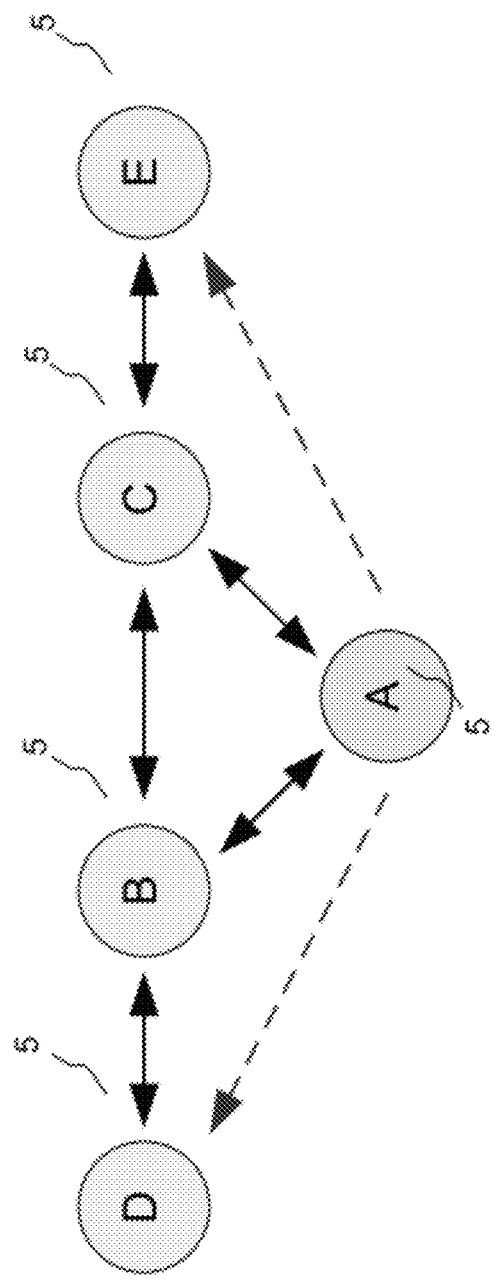
FIG. 2 illustrates a network topology according to an embodiment of the invention.

The network protocol layer may make abstraction of PHY-specific network identifications like single cluster, multi-cluster or heterogeneous networks. Instead, the communication relationships between devices may be characterized in terms of neighbours, next hops and hop counts. The available communication links between the different devices may be shown explicitly and characterized as being symmetrical or asymmetrical. In this way, no distinction has to be made between multi-cluster networks and heterogeneous networks except by identifying router devices as routers or as bridges. From this viewpoint, the network topology of FIG. 1*b* can be represented as shown in FIG. 2.

A line with two arrows indicates that the link is symmetrical, e.g. device D can receive data from device B and device B can receive data from device D. When the link is asymmetrical a line with one arrow is used, e.g. device D can receive data from device A but device A can not receive data from device D. Such links can not be used for setting up a connection. A dotted line is used to indicate that the link is not reliable. It means that device D might receive (now and then) valid beacons from device A but a data stream from A to D might contain errors or might even be interrupted regularly.

A beacon channel may start in timeslot 0 of a superframe. It may be used to transmit beacon frames that contain the address of the device that is transmitting the beacon, the address of the network manager, and the timeslots allocated to the random access channel and the control channel. The control channel may be a connection-less communication (CLC) channel that may be used to send control messages between devices within a network in an organised way, e.g. with the aim to avoid collisions of control messages. Such beacon information may be required for devices that want to join the network. Beacon frames may also be used to monitor the presence of devices.

The sync channel may be used by a network access point to transmit sync frames when it does not transmit a sufficient amount of data frames to enable neighbour devices to get synchronized and to stay synchronized. Such sync channels may be used during the creation and the setup of a new network.

The random access communication (RAC) channel may be used by devices to send a join request to a network access point. It may also be used by joined devices that have no access to the control channel for sending messages to other devices within the network.

Synchronisation

In each device the timing for the communication protocol is derived from a local master clock. It can be the RC oscillator of the MI physical layer, the master clock of the audio interface or an external crystal oscillator. The on-chip local oscillator of the protocol processor is locked to this master clock, and used to determine the timing for the frames and the superframes. In some embodiments requiring low power and a small form factor an on-chip RC oscillator may be used. Such an RC oscillator may deviate up to 1% from its nominal value. In case the devices of an MI-based network use this RC oscillator as a clock reference for the protocol processor, the oscillator frequency of the different devices needs to be synchronized with the network master clock in order to avoid large timing offsets.

By default, the RC oscillator of the Network Manager (NWM) will become the master clock for the whole wireless network. Therefore, it will be configured with its nominal settings.

The NWM transmits beacon frames, sync frames and/or data frames with a timing and a carrier frequency that is derived from its local RC oscillator. The density of these frames are preferably arranged to be sufficiently high to keep the other devices in sync.

The protocol processor of each device knows the basic communication parameters like channel rate, timeslot size and superframe size. When a carrier is detected and frame syncs are found, the MAC layer may adjust the phase of its time base in such a way that the locally generated timeslots are aligned with the frame syncs which are received at the start of a time slot.

When the integrated phase error deviates from zero, the local clock reference is running either too fast or too slow. Therefore the MAC layer may generate a frequency correction signal for its local master clock, i.e. the RC oscillator, to reduce the average value of the integrated phase error to zero. In addition to this slow feedback loop, the MAC processor may provide additional phase corrections in the digital time base to keep its local time base reference aligned with the received frames. In this way, every wireless device of a network may synchronize its local RC oscillator and its superframe time base with the RC oscillator and the time base of the Network Manager.

Optionally, devices can send occasionally a "clock information" message to the clock master of the wireless network, containing the frequency control value of its local RC oscillator. In this way, the clock master can verify whether all control values are within the preferred operating range and possibly change (gradually) its own local oscillator control value if needed.

The Use of Sync Frames

In previous section above (entitled "Synchronisation") it is mentioned that the RC oscillator of the MI physical layer can be used as master clock of an MI-based wireless network (e.g. the RC oscillator of the Network Manager). Its frequency is not as stable as the frequency generated by a crystal oscillator, and it can change quite rapidly (within a tolerance range of typically 1%) under influence of e.g. power supply voltage variations and local on-chip temperature changes.

If only a beacon frame is used for time synchronization, a frequency deviation of e.g. 0.5% will cause a full timeslot miss-alignment at the end of a typical superframe with 256 timeslots. Such a large deviation is not acceptable.

In some embodiments a destination device may receive a schedule for receiving data frames and it may use the position of the frames received in these slots as a time reference. A device that is not a Network Manager may schedule dedicated receive slots to stay synchronized with another network device (e.g. the NWM). It may only detect the position of the frame sync word and it may verify the frame header checksum to reduce the probability of false sync word detections. The payload of the frame may be ignored since it may not be relevant for obtaining synchronisation information. This position is compared with the expected position obtained from the time base (=the beginning of a timeslot) and deviations of the time base can then be corrected.

When a Network Manager wants to create a network there are no data frames to transmit yet, and the density of the beacon frames may be too low to enable synchronization of other devices. Therefore, according to proposed embodiments, the Network Manager may transmit additional sync frames with a density that is high enough to keep other devices within its transmit range in sync. The proposed sync frame may be devoid of data (i.e. have no data field and no data checksum field) or it may contain specific sync information like e.g. the number of time slots in a superframe and the time slot index in which a specific sync frame is transmitted. In a similar way, a network Access Point may also transmit additional sync frames when needed, e.g. in case the density of the beacon frames and the data frames it transmits is too low to keep other devices within its transmit range in sync.

When a network manager or a network access point starts transmitting data, part or all of the sync frames may be replaced by data frames. If the density of the transmitted data frames is too low, additional sync frames may be inserted. Also other network access points may receive from the NWM a schedule for an additional sync frame channel if the density (rate) of the data frames they are transmitting is too low (i.e. below a predetermined threshold value).

An overview of the functionality for a proposed communication protocol will now be described further based on some typical use examples. This overview does not cover all possible use cases. It simply serves to highlight some typical target applications. For the physical layer generic names like 'wireless hearing aid transceiver' and 'hearing aid network' will be used to provide an abstraction of the type of wireless system (MI or RF) that can be used.

Basic Wireless Configuration

Figure 3:
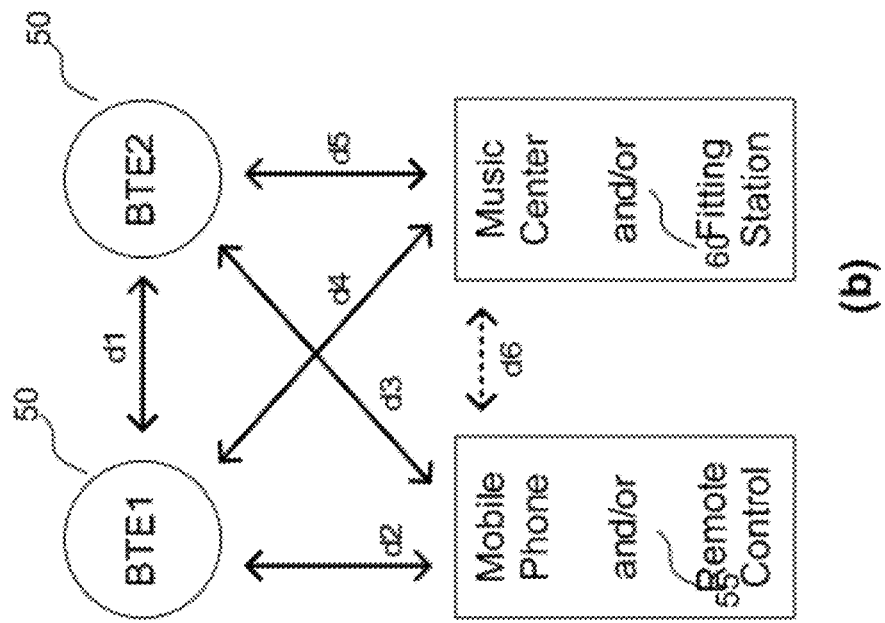
FIGS. 3a and 3b illustrate a network configuration for a wireless hearing aid application according to an embodiment of the invention.
Figure 3:
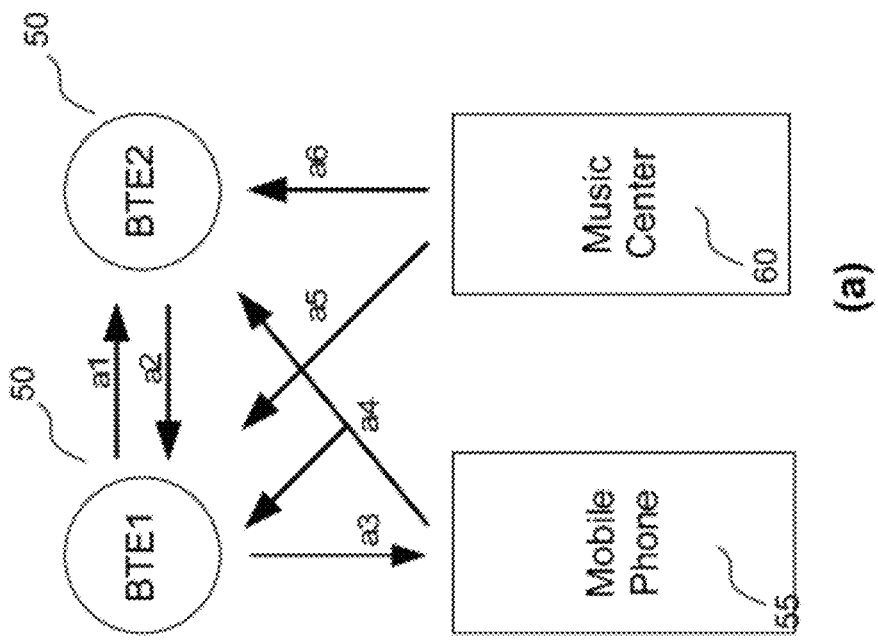

A typical network configuration for a basic wireless hearing aid application is shown in FIGS. 3A and 3B. The following devices are involved:

Two 'Behind The Ear' (BTE) hearing instruments 50;

A Mobile Phone (MPH) 55 or a Remote Control (RC) 55; and

A Music Center (MC) 60 or a Fitting Station (FS) 60.

All devices are assumed to have an integrated wireless hearing aid transceiver and an integrated MAC protocol handler.

In FIG. 3A, a number of typical audio streams are indicated, while FIG. 3B shows some typical data streams between the same devices. In case only data is considered, the MPH 55 could be replaced by a RC, and the MC 60 by a FS 60 for the hearing instruments, as indicated in FIG. 3B. The protocol may support audio and data simultaneously. The data streams may be low rate (e.g. user interface information, link status and control) or high rate (e.g. connection setup, firmware upload, fitting data), but they are typically not time bounded like audio streams.

Extended Wireless Configuration

The basic wireless configuration can be considered as a single cluster hearing aid wireless network, supporting the target applications mentioned in previous section.

In some embodiments, wireless hearing aid applications may be extended with Cochlear Implants (CI) for the left and/or the right ear. The power consumption of such devices needs to be very low and therefore the transmit range of these devices will also be very low. It is expected that a CI may only be able to communicate with the BTE of that specific ear although it can not be guaranteed that its signal will not be captured by other devices, e.g. the BTE of the other ear.

Figure 4:
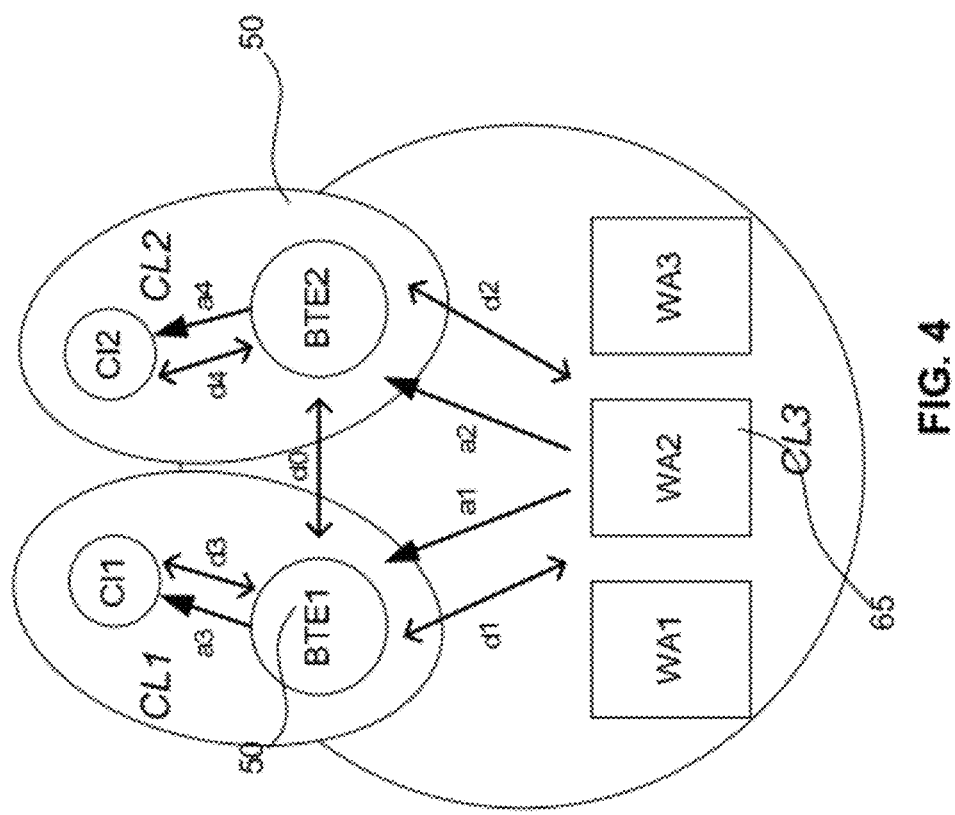
FIG. 4 illustrates a modification to the configuration of FIGS. 3a and 3b wherein the hearing aid application has been extended with Cochlear Implants.

A typical setup of such an extended configuration is shown in FIG. 4.

The basic wireless configuration is cluster three (CL3), in which two BTEs 50 are active and one Wireless Assistant 65 (WA2). The WA may—for example—be a combination of a Music Center and a Remote Control. Such a basic wireless hearing aid system may be extended with two cochlear implants CI1 and CI2. These implants have a transmit range indicated by respectively a first cluster (CL1) and second cluster (CL2).

It is expected that in a typical use case the cochlear implants will not be able to receive data frames from cluster 3 in a reliable way nor will they be able to transmit data to other devices than to the nearby BTE device. Therefore the devices BTE1 and BTE2 have to forward audio streams a1, a2 and data streams d1, d2 to respectively CI1 and CI2 via streams a3, a4 and d3, d4. They also have to forward data packets in the reverse direction, i.e. from the CI devices to the WA device(s).

It cannot be guaranteed that the different clusters will not interfere with each other. Cluster three may overlap with the first cluster (CL1) and second cluster (CL2). Therefore this configuration may require extra data capacity that has to be provided by the physical layer of the wireless link. This may be obtained by increasing the data rate of the link or by operating the different clusters at different frequencies or by using different physical layers (see the section below entitled "Heterogeneous Wireless Configuration").

The MAC layer may support the forwarding of data packets (both audio streams and asynchronous data), and it should preferably be able to synchronize the data frames in the different clusters, taking into account the different physical layer implementation approaches mentioned above.

Heterogeneous Wireless Configuration

An extended wireless configuration like the one shown in FIG. 4 may use the same physical layer (e.g. Magnetic Induction) for all clusters but it is also possible to select a different physical layer for one of the clusters.

It is known that an MI link has a limited range, which might cause problems for the connection between the Wireless Assistant and the BTE devices. Therefore, an alternative approach may use an RF physical layer for cluster 3 instead of an MI physical layer, since an RF link can provide a larger range. If clusters 1 and 2 make use of an MI physical layer, the BTE devices have to include both physical layers (MI and RF). These devices also have to bridge data between both domains, in a similar way as when all clusters use the same physical layer.

For this configuration it is preferred that a single MAC controller is used for both physical layer domains. This means that interfaces have to be provided for both PHYs. The MAC layer should preferably support the forwarding of data packets (both audio streams and asynchronous data) between both domains and also be able to synchronize the data frames between the different clusters in order to keep the overall latency for audio applications low and controllable.

Figure 5:
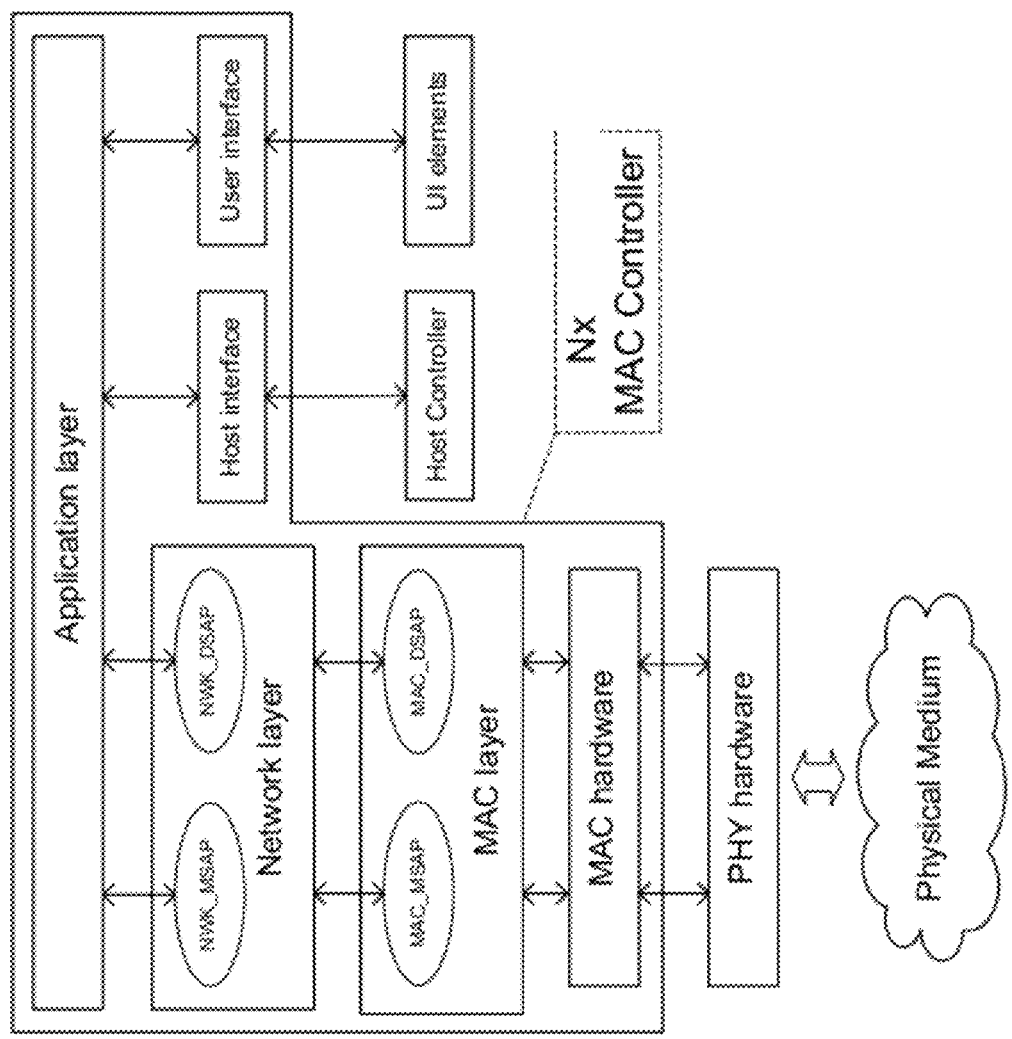
FIG. 5 is a block diagram of the architecture of a wireless hearing aid device according to an embodiment of the invention.

An exemplary architecture of a wireless hearing aid device according to an embodiment of the invention is shown in FIG. 5.

MAC Frame Concept

In some embodiments the MAC protocol may use a superframe that is subdivided in a number of time slots with fixed length. A superframe may contain a collection of frames. A frame may have a length of one or more time slots and start at the edge of a time slot. A superframe may contain different frame types like data frames, audio frames, beacon frames and sync frames.

A frame, whether it is a beacon frame, an audio frame, a data frame or a sync frame may have a similar structure. Each frame may contain a preamble, a sync word, a header field, a data field and a CRC/FEC field. It may be preceded by a start-up gap for activating the required hardware blocks.

Figure 6:
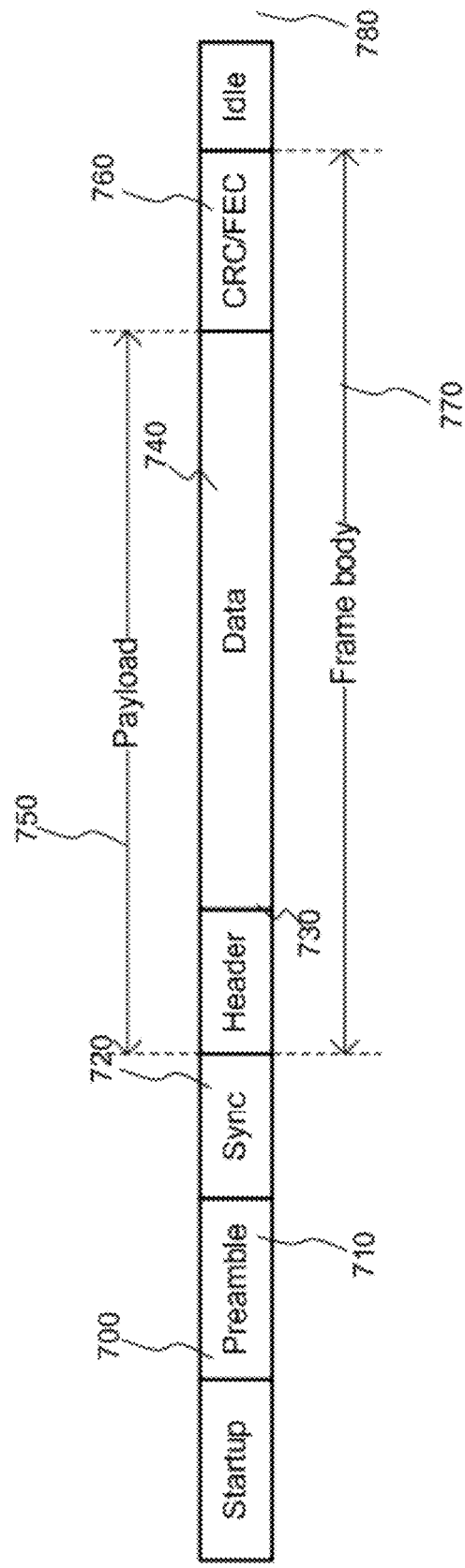
FIG. 6 illustrates the different fields of a Medium Access Control (MAC) frame according to an embodiment of the invention.

The different fields of a frame are shown in FIG. 6 and will be described below.

Startup Field 700

The startup field 700 represents the time needed to switch from standby mode to active RX or TX mode, or to switch from RX to TX or vice versa. It can also include the time needed by a PLL circuit to reach the 'locked' status.

Preamble Field 710

The preamble 710 is a bit sequence used to synchronize the data clock recovery system in the receiver with the incoming bit stream. The preamble is PHY-specific and may typically be one byte long with a value of either 01010101 or 10101010.

Sync Field 720

The sync field is used to indicate the start of the frame and to get the correct word alignment to decode the subsequent fields of the frame. The sync field may also be used to identify the destination address or to identify the frame type. The sync field may be PHY-specific.

Header Field 730

The header field may contain frame-specific information like frame size, source address, destination address, length of the data field, payload-specific information, etc. A header-specific CRC field may also be added. The header field is application-specific and should preferably be PHY-independent. However, the MAC layer may need to analyze it to determine the length of the frame.

Data Field 740

The data field may contain the actual data to be transmitted. Typical data types are (compressed) audio samples, user interface data, high speed data and MAC control messages. The data field is application-specific and should be PHY-independent.

Payload Field 750

The payload field comprises the header field 730 and the data field 740. This field may be application-specific and may not be modified by the MAC layer.

CRC/FEC Field 760

The payload field 750 may be protected by means of a Forward Error Correction (FEC) code, e.g. Reed Solomon block coding or convolutional encoding with Viterbi decoding. FEC is typically used to correct bit errors in the received data stream.

It is also possible to add a Cyclic Redundancy Check (CRC) covering the data field and eventually also the header field. It can be used to verify whether the CRC-protected data block contains bit errors or not. Based on the CRC test result at receiver side, an Automatic Repeat re-Quest (ARQ) procedure can initiate a re-transmission of the frame in case a mismatch is detected.

Frame Body Field 770

The frame body field comprises the payload field 750 and the CRC/FEC field 760.

Idle Field 780

The idle field 780 indicates the gap between the end of the frame and the start of next time slot. During this period the PHY and the MAC may switch to standby mode to save power.

Data frames may be used to carry data that needs a guaranteed, reliable data delivery, similar to TCP/IP data packets. Audio frames may be used to carry streaming data like audio for which a timely delivery is more important than a guaranteed (bit-true) delivery. Beacon frames may be used to indicate the start of a superframe and may contain data about the superframe structure. Sync frames may be used to enable the physical layer of wireless devices to get synchronised with other devices in the wireless network and to stay synchronised with these devices. These frames may contain synchronisation-specific data.

Sync frames may be used to enable the receivers to stay in sync with the transmitter frequency and the transmitter channel clock when a superframe is nearly empty.

Beacon frames may be used to indicate the start of a superframe and to provide specific information about the organization of the subsequent superframe.

The following subsection provides more details about the sync frame format.

Under normal operating conditions, receiving devices remain in lock with transmitting devices by measuring the distance between beacon frames and between scheduled audio or data frames, and by adjusting the local reference clock when the measured distance (expressed in number of reference clock cycles) deviates from the expected value.

Sync frames can be used during network initialization to enable receivers to get quickly in lock with the device that is setting up the network. Sync frames can also be used by candidate source devices for streaming (audio) data, to keep candidate destination devices in lock when a superframe is nearly empty. This can be needed when the receiving devices use an internal reference oscillator that can have a relatively large frequency drift as a function of time, such as an RC oscillator.

A sync frame according to the proposed embodiment is a frame with a specific payload that has only a header field. In other words, the proposed sync frame may be viewed as a special case of a data frame wherein the data frame is devoid of a data field.

The payload field of a sync frame 800 according to an embodiment is shown in FIG. 7.

As seen from FIG. 7, a sync frame 800 is a data frame with a specific frame type (e.g. "0") and with a specific address type (e.g. "3"). Next to this information, the header field 730 also contains following fields:

A CurrentSlot value 830, indicating the timeslot used by the current sync frame;

A NextSlot value 840, indicating, with reference to the CurrentSlot value+1, the offset to the timeslot in which the next sync frame will be transmitted, A header checksum HCS 850, as used for the header of regular data frames.

Such a sync frame is shorter than a regular data frame, so that the idle period 780 may be large. During this period, the transmitter may switch to standby mode and the receivers can execute any adjustment needed to align its local reference clock and its RF tuning circuitry. Since such a sync frame is short it will typically occupy only one timeslot.

Sync frames can be detected by searching for a data frame with a specific frame type (e.g. "0") and with a specific address type (e.g. "3"). When a match is found the header checksum HCS may be verified. In case no bit errors are detected the probability is quite high that a valid sync frame has been found.

The NextSlot field indicates after how many timeslots the next sync frame will be transmitted. If on this position also a valid sync frame is found, it may be assumed that the receiver is in sync with the transmitter.

The receiver can use the NextSlot value to stay in (low power) standby mode in between the sync frames. The NextSlot offset can also refer to the time slot in which the beacon frame will be transmitted (e.g. time slot 0).

In some embodiments the Network Manager may determine the repetition rate at which sync frames have to be transmitted. In other embodiments devices may communicate the maximum distance allowed between frame syncs to stay in lock. This information may be provided during the discovery process of the devices.

Sync frames may be transmitted in a dedicated sync channel. This channel may be removed when the superframe is sufficiently filled with audio frames and/or data frames so that the devices may use the sync words of these frames to remain in sync Various modifications will be apparent to those skilled in the art.

The invention claimed is:

1. A method of synchronizing a reference clock of a first wireless circuit device with a master reference clock of a second wireless circuit device, the method comprising:
    transmitting, from the second wireless circuit device to the first wireless circuit device, a dedicated synchronization frame via a dedicated synchronization channel;
    receiving the dedicated synchronization frame at the first wireless circuit device via a magnetic-induction (MI) based wireless network; and
    synchronizing the reference clock of the first wireless circuit device with the master reference clock of the second wireless circuit device based on the dedicated synchronization frame received via the MI-based wireless network.

2. A method of synchronizing a reference clock of a first wireless circuit device with a master reference clock of a second wireless circuit device via a wireless network, the method comprising:
    transmitting, from the second wireless circuit device to the first wireless circuit device, a dedicated synchronization frame via a dedicated synchronization channel;
    receiving the dedicated synchronization frame at the first wireless circuit device via the wireless network;
    synchronizing the reference clock of the first wireless circuit device with the master reference clock of the second wireless circuit device based on the dedicated synchronization frame received via the wireless network; and
    synchronizing the reference clock of the first wireless circuit device with the master reference clock of the second wireless circuit device based on one of a received data frame and a beacon frame.

3. A method of synchronizing a reference clock of a first wireless circuit device with a master reference clock of a second wireless circuit device via a wireless network, the method comprising:
    transmitting, from the second wireless circuit device to the first wireless circuit device, a dedicated synchronization frame via a dedicated synchronization channel;
    receiving the dedicated synchronization frame at the first wireless circuit device via the wireless network;
    synchronizing the reference clock of the first wireless circuit device with the master reference clock of the second wireless circuit device based on the dedicated synchronization frame received via the wireless network; and, wherein the step of transmitting a dedicated synchronization frame via the dedicated synchronization channel is undertaken when a rate of frame transmission between the first and second wireless circuit devices is less than a predetermined threshold value.

4. A method of synchronizing a reference clock of a first wireless circuit device with a master reference clock of a second wireless circuit device via a wireless network, the method comprising:
    transmitting, from the second wireless circuit device to the first wireless circuit device, a dedicated synchronization frame via a dedicated synchronization channel;
    receiving the dedicated synchronization frame at the first wireless circuit device via the wireless network;
    synchronizing the reference clock of the first wireless circuit device with the master reference clock of the second wireless circuit device based on the dedicated synchronization frame received via the wireless network; and wherein the dedicated synchronization frame comprises a Medium Access Control, MAC, data frame devoid of a data field.

5. The method of claim 1, wherein the dedicated synchronization frame comprises information defining a timeslot used by the dedicated synchronization frame, the timeslot being derived with reference to the master reference clock.

6. The method of claim 5, wherein the dedicated synchronization frame further comprises information defining a timeslot in which a further dedicated synchronization frame is to be transmitted.

7. The method of claim 1, further comprising the steps of:
    transmitting a beacon frame from the second wireless circuit device, the beacon frame indicating a start of a superframe comprising a plurality of frames;
    receiving the beacon frame at the first wireless circuit device; and
    modifying the reference clock of the first wireless circuit device based on the received beacon frame.

8. The method of claim 1, wherein the first and second wireless circuit devices are MI-based wireless network devices.

9. A wireless device having a reference clock for synchronizing with a master reference clock via a magnetic-induction (MI) based wireless network, the wireless circuit device comprising:
 a receiving unit, including receiver circuitry configured for receiving information via the magnetic-induction (MI) based wireless network, adapted to receive a dedicated synchronization frame via a dedicated synchronization channel; and
 a processor, including logic circuitry, adapted to synchronize the reference clock with the master reference clock based on the dedicated synchronization frame received via the magnetic-induction (MI) based wireless network.

10. The wireless device of claim 9, wherein the processor is further adapted to synchronize the reference clock with the master reference clock based on a received data frame or beacon frame.

11. A wireless device having a reference clock for synchronizing with a master reference clock via a wireless network, the wireless circuit device comprising:
 a receiving unit, including receiver circuitry configured for receiving information via the wireless network, adapted to receive a dedicated synchronization frame via a dedicated synchronization channel; and
 a processor, including logic circuitry, adapted to synchronize the reference clock with the master reference clock based on the dedicated synchronization frame received via the wireless network
 a transmission unit adapted to transmit a dedicated synchronization frame via the dedicated synchronization channel when a rate of frame transmission in the wireless network is less than a predetermined threshold value, and wherein the dedicated synchronization frame includes a Medium Access Control, MAC, data frame devoid of a data field.

12. The wireless device of claim 9, wherein the dedicated synchronization frame comprises information defining a timeslot used by synchronization frame, the timeslot being derived with reference to the master reference clock.

13. A non-transitory computer-readable medium that stores a computer program comprising computer program code adapted to perform, when run on a computer, the steps of claim 1.

14. A method of synchronizing a reference clock of a first wireless circuit device with a master reference clock of a second wireless circuit device via a wireless network, the method comprising:
 transmitting, from the second wireless circuit device to the first wireless circuit device dedicated or exclusively synchronization frames via a dedicated synchronization channel, and transmitting at least one of the synchronization frames in response to rate of frame transmission between the first and second wireless circuit devices falling to less than a threshold value;
 receiving the dedicated synchronization frame at the first wireless circuit device via the wireless network; and
 synchronizing the reference clock of the first wireless circuit device with the master reference clock of the second wireless circuit device based on the exclusively synchronization frames received via the wireless network over the dedicated synchronization channel.

15. The device of claim 9, wherein the receiving unit is configured and arranged to receive a plurality of synchronization frames on the dedicated synchronization channel, with all frames being received on the dedicated synchronization channel exclusively being synchronization frames.

16. The device of claim 15, further including a transmission unit configured and arranged to transmit the synchronization frames on the dedicated synchronization channel, by exclusively transmitting synchronization frames on the dedicated synchronization channel.

17. The method of claim 1, further including establishing the dedicated synchronization channel in the wireless network, based on a density of available wireless frames on another communication channel in the wireless network.

18. The device of claim 9, wherein the wireless device is configured and arranged to install the dedicated synchronization channel in the wireless network, based on a density of available wireless frames on another communication channel in the wireless network.

19. The method of claim 14, wherein the dedicated synchronization frame comprises information defining a timeslot used by at least one of the synchronization frames, the timeslot being derived with reference to the master reference clock.

* * * * *